United States Patent [19]

Brosh

[11] Patent Number: 4,507,638

[45] Date of Patent: Mar. 26, 1985

[54] ROTARY POSITION SENSORS EMPLOYING PLANAR COILS

[76] Inventor: Amnon Brosh, 16 Sunnyside Dr., Montvale, N.J. 07645

[21] Appl. No.: 329,284

[22] Filed: Dec. 10, 1981

[51] Int. Cl.³ .............................................. H01F 21/02
[52] U.S. Cl. ...................................... 336/79; 336/130
[58] Field of Search .................. 336/130, 135, 30, 87, 336/75, 77, 79; 323/347, 348

[56] References Cited

U.S. PATENT DOCUMENTS

| | | | |
|---|---|---|---|
| 1,558,473 | 10/1925 | Gordon | 336/79 |
| 2,511,897 | 6/1950 | Booth | 336/30 X |
| 2,521,963 | 9/1950 | Beusman | 336/87 X |
| 2,629,860 | 2/1953 | Chesus et al. | 336/79 |
| 3,090,933 | 5/1963 | Henry-Baudot | 336/79 X |
| 3,699,558 | 10/1972 | Hendley et al. | 336/79 X |
| 3,819,025 | 6/1974 | Fushida et al. | 336/135 X |
| 4,098,364 | 7/1978 | Schedrovitsky et al. | 336/135 X |
| 4,123,735 | 10/1978 | Mash et al. | 336/87 X |
| 4,156,192 | 5/1979 | Schedrovitsky et al. | 336/135 X |

Primary Examiner—Thomas J. Kozma
Attorney, Agent, or Firm—Arthur L. Plevy

[57] ABSTRACT

A series of rotary sensors are disclosed. Each sensor consists of a drive coil which is a planar coil configuration separated from a sensing coil which is parallel to the drive coil. Interposed between the drive and sensing coils is a rotatable plate fabricated from a material capable of blocking a magnetic field induced in a drive coil from reaching or activating the sensing coil. The rotatable plate is shaped to allow predetermined amounts of flux to couple from the drive coil to the sensing coil as the plate is rotated. The shape of the plate therefore determines the signal provided at the sensing coil to enable one to provide such signals indicative of the angular movement of the plate between wide limits as from zero to 360°. Other configurations utilizing a plurality of drive and sense coils and special shaped plates provide sine and cosine outputs as well as enable one to determine the quadrant of operation.

5 Claims, 10 Drawing Figures

ROTARY POSITION SENSORS EMPLOYING PLANAR COILS

BACKGROUND OF INVENTION

This invention relates to planar coil configurations and more particularly to such structure employed as a rotary displacement sensor.

There is a need for rotary sensors which are capable of providing an output according to a selected angle of rotation. The prior art shows many such devices but there does not exist such a sensor or transducer that is inexpensive and is capable of a wide range of operation. In most prior art sensors great difficulty is encountered in traversing a large angular range. There are sensors which will provide sine or cosine waveforms but these are relatively expensive and very complicated.

The concept of using planar coil configurations to provide sensor operation as to convert linear or rotary motion to an electrical output signal has been described in my copending application entitled PLANAR COIL APPARATUS FOR PROVIDING MOTION SENSORS, SWITCHES AND VARIOUS STRUCTURES filed on Dec. 8, 1980 as Ser. No. 214,725, now abandoned. In this application, two planar coil members are positioned one above the other in a parallel plane to provide a space between the members. A ferromagnetic coupling member is movably, positioned in the space to thereby allow a magnetic filed induced in one coil to couple to the other coil when the member is moved out of the space and to prevent coupling of the magnetic field when the member is disposed within the space. As explained in that application, the planar coil configuration offers great advantages in regard to providing inexpensive and reliable transducer operation.

The concept of using planar coils has also been described in my copending application entitled PLANAR COIL APPARATUS EMPLOYING A STATIONARY AND A MOVABLE BOARD filed on Feb. 9, 1981 as Ser. No. 232,654, now U.S. Pat. No. 4,425,511. In this application a first stationary planar coil is located adjacent to another planar coil which may be fabricated on the same circuit board. A drive signal is applied to the input terminals of one of the coils. A second planar board is positioned above the first board and has located thereon a planar coil configuration which constitutes a closed loop. This board is moved with respect to the stationary board and magnetic flux is coupled via the closed loop from the drive coil to the other coil which is defined as a sense coil. In this configuration by monitoring the output of the sense coil a signal can be detected indicative of the distance that the movable board traversed. Therefore these sensors provide a signal indicative of the distance moved.

As is known, prior art devices which operate as sensors may be variable resistance elements such as those used in displacement transducers as well as other sensing devices which are inductive or capacitive devices. These prior art devices are extremely expensive to manufacture and less reliable than the type of sensors using planar coils as above described.

U.S. Pat. No. 4,253,079 issued on Feb. 24, 1981 entitled DISPLACEMENT TRANSDUCERS EMPLOYING PRINTED COIL STRUCTURES by Amnon Brosh, the inventor herein disclosed the displacement transducer which includes a plurality of planar coil structures. The structures are located on separate planar boards each of which have a central aperture and are positioned in a stacked array separate from one another. A magnetic member is inserted into the aligned apertures to vary the coupling between the coils. Thus this Patent which was awarded to the inventor herein depicts the use of planar coil configuration employed in a displacement transducer.

This application involves analog sensors and relates to the fabrication and construction of a rotary sensor structure utilizing planar coils. The structure to be described is extremely simple to construct while being reliable in operation. By using such a device one can provide electrical output signals which are indicative of angular movement over a wide range of angular positions as well as providing output waveforms which are proportional to sine or cosine functions. The apparatus to be described is extremely compact and simple to construct.

BRIEF DESCRIPTION OF THE PREFERRED EMBODIMENT

A rotary displacement transducer comprising a first planar member having disposed on a surface thereof at least a first flat configuration manifesting a first coil, a second planar member having disposed on a surface thereof at least a second flat configuration manifesting a second coil, with said second member positioned apart from said first member and relatively parallel to and facing said first member to form a space therebetween, whereby any magnetic field induced in one of said members can couple to the other, a rotatable plate rotatably positioned in the space between said members and fabricated from a material sufficient to block said magnetic field, said plate being eccentric and shaped to permit selective coupling of said magnetic field between said coils as said plate is rotated with said coupling being a function of the shape of said plate.

DETAILED DESCRIPTION OF THE INVENTION

A basic problem is to provide an analog sensor using an inductance which exhibits a linear analog output in an operating range in excess of 30 or $-90°$. In regard to such a device there has always been a need for a rotary sensor which can measure or respond to an angular movement as close to 360° as possible. No simple solution has evolved for providing such a transducer which possesses a linear output v. an angular position for changes in angle in excess of 180°.

Figure 1:
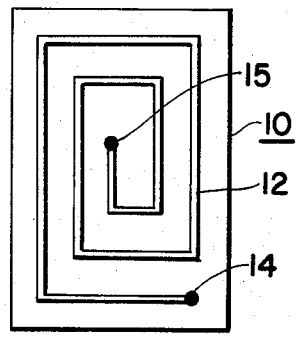
FIG. 1 is a top plan view of a planar coil employed in this invention.

Referring to FIG. 1, there is shown a planar coil configuration 10. As will be explained, the planar member 10 is a printed circuit board employing conventional printed circuit materials, such as glass, cloth, teflon or a paper base phenolic composition. It is of course understood that many materials can be employed for the circuit board 10 as are presently used to fabricate conventional printed circuits, as well as those structures which are employed in the fabrication of thick and thin film circuits. Mounted on the board 10 is a coil configuration 12. The coil is etched, stamped, printed or plated on the planar base member 10 and a suitable conductor material such as copper is used to construct the coil according to printed circuit techniques. As seen, the coil has terminals 14 and 15 to which can be connected a drive source such as an AC or pulse generator for energizing the coil or an output circuit such as transistor detector or some other conventional circuit for responding to the electrical signal produced in the coil. The planar coil structure as shown in FIG. 1 can therefore be used as a drive coil or a sensing coil both of which components will be referred to in the following figures.

Figure 2:
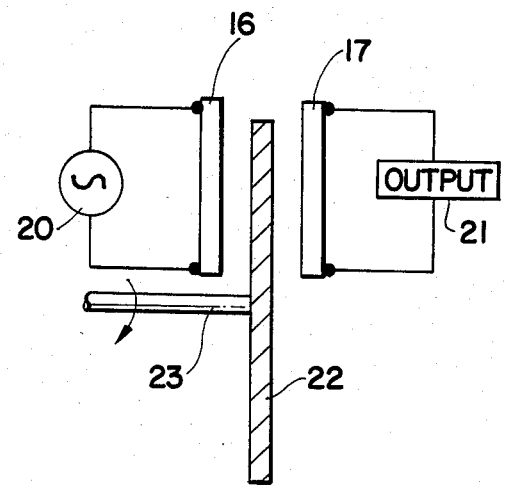
FIG. 2 is a side schematic view of a rotary sensor according to this invention.

Referring to FIG. 2, there is shown a side view of a rotary sensor according to this invention. A drive coil 16 of the type shown in FIG. 1 has coupled to the input terminals a source of AC or pulse signals 20. Located relatively parallel to and spaced from the drive board 16 is a sensing planar coil 17. As indicated, both coils may have the structure shown in FIG. 1. Coupled to the terminals of the sensing coil 17 is an output circuit 21. The output circuit 21 may include a transistor amplifier having an input circuit coupled to the output terminals of the coil 17 and capable of providing a DC signal such as via a peak or average detector indicative of the intensity of a signal coupled to the coil. Located and disposed between the two coils is a rotatable plate or eccentric member 22. The member 22 may be fabricated from a ferromagnetic material or from a suitable metal which will operate to prevent coupling between coil 16 and coil 17 when the material is positioned to block the respective coils. The plate 22 is coupled to a shaft 23 which allows the user to rotate the member 22 with respect to the coils 16 and 17.

Figure 3:
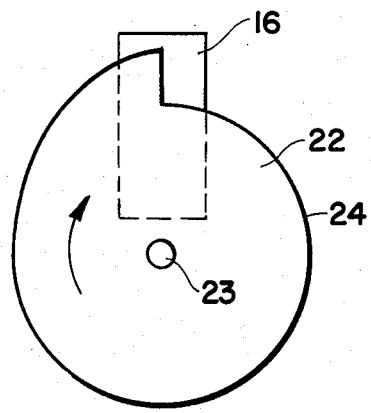
FIG. 3 is a front view of a rotary plate used in this invention.

Referring to FIG. 3, there is shown a front view of the plate 22 with respect to the coil 17. As can be seen from FIG. 3 the plate 22 is a cam like member having a definite pattern peripheral surface 24. As the plate 23 is rotated the configuration progressively blocks coil 16 from coil 17 and thus allows more flux to be coupled from coil 16 to coil 17 as plate 22 is rotated. In this manner the plate 22 is shaped so that an increasing amount of flux or magnetic field is coupled from the drive coil 16 to the planar sensing coil 17. The spiral pattern on the periphery of the plate is formulated so that the radius at an angle is a linear function of that angle. This can be easily accomodated by machining the plate according to that relationship. In this manner the sense coil via the detector 21 will provide a linear output v. angular position as the plate 22 is rotated. Because of the structure one can obtain an angular position reading up to 360°. As can be seen from FIG. 2, the sense coil 17 and drive coil 16 are completely separate from and isolated from the rotary plate 22.

Figure 4A:
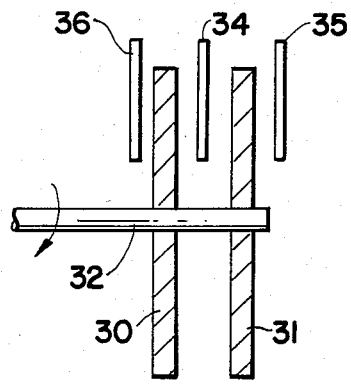
FIG. 4A is the alternate embodiment of a rotary sensor according to this invention.
Figure 4B:
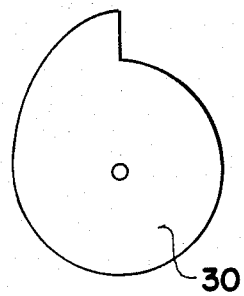
FIGS. 4B and 4C depict different rotary plate configurations.
Figure 4C:
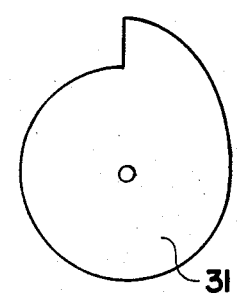

Referring to FIG. 4A, there is shown a rotary sensor which provides a balanced construction. In FIG. 4A there are two plates 30 and 31 secured to the rotatable shaft 32. Plate 30 has the configuration shown in FIG. 4B while plate 31 has the configuration shown in FIG. 4C. Located between the plates 30 and 31 is a drive coil 34. The drive coil 34 has a signal source (not shown) coupled to its terminals. Located on the other side of plate 31 is a first sense coil 35. Located on the other side of plate 30 is a second sense coil 36. Coils 34, 35 and 36 are parallel to one another and arranged in the same plane and relatively congruent. In the sensor shown, as the shaft is rotated the amount of flux coupled from the drive coil 34 to one sense coil 36 increases while the amount of flux coupled to the other sense coil 35 decreases in the same amount. In this manner one has a balanced output from the sense coils 35 and 36 over the full angular range.

Figure 5:
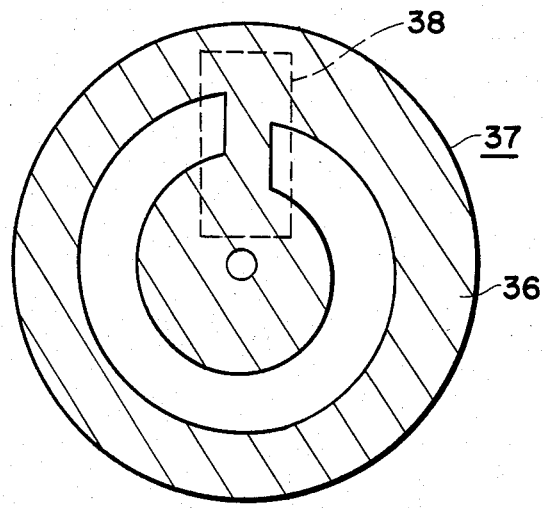
FIG. 5 is a top plan view of a rotary plate configuration according to this invention.

Referring to FIG. 5, there is shown another embodiment of a plate 36 which can be employed with this invention. As can be seen, the plate 36 has a spiral pattern printed, stamped or otherwise formed on the circuit board 37. As compared to the plate shown in FIGS. 3 and 4, the plate shown in FIG. 5 is circular and completely symmetrical about the center. In any event, the pattern located on the plate 37 is unsymmetrical and will allow a predetermined coupling of the magnetic field as the circular plate is rotated. The board 37 may be fabricated from an insulator material which will not block a magnetic field. The spiral pattern on the board is then deposited by the use of conventional techniques employing a metal or ferromagnetic material.

As one can see from FIG. 5, the circuit board 38 which may constitute a drive coil as 16 of FIG. 2 is located on one side of the board while the sense coil as 17 of FIG. 2 (not shown) is located on the other side of the board. As the board or plate is rotated a magnetic field is induced from one coil to the other depending upon the nature of the spiral pattern. In this manner the flux or magnetic field induced in the drive coil is concentrated at the center of the coil and hence the structure shown in FIG. 5 is extremely efficient and rugged. It is of course understood that the rotary sensors as depicted above can be extremely small and compact as the boards are relatively thin as are the rotatable plate members. Typically, the coils may be of about ¼ of an inch in length and width and may be rectangular or circular. The boards may be less than a ¼" in thickness and spaced apart by distances between 0.03125 to 0.125".

Figure 6A:
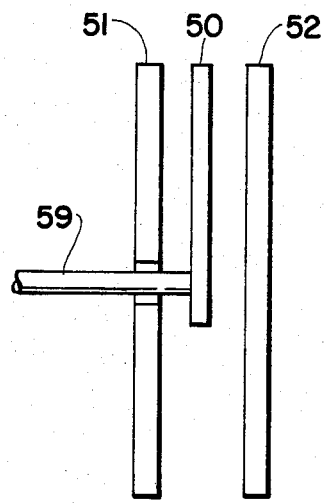
FIGS. 6A and 6B are respectively a side and top view of a rotary sensor employing a sine or cosine output.

Referring to FIG. 6A, there is shown a side view of a rotary sensor according to this invention which will provide a sine or cosine output as the plate 50 is rotated between the stationary drive board 51 and a parallel and stationary sense board 52.

Figure 6B:
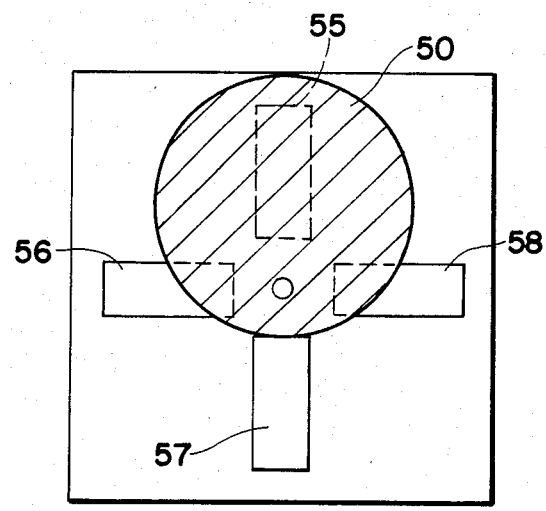

Referring to FIG. 6B, the drive board 51 contains four coils as 55, 56, 57 and 58. Each coil is placed 90° apart from the other and is of a same size. In a similar manner the sense board 52 has the exact same coil pattern and hence there is a corresponding coil on the sense board for each coil on the drive board. The coils on the drive board may be connected in series or in parallel and driven from a common drive source or a signal generator. The plate 50 is rotatable as coupled to a rotatable shaft 59.

As seen in FIG. 6B, the plate 50 is shaped so that as it enters the coil the sense board will provide an output which varies as the sine of the angle. For example, coils 55 and 57 are perpendicular to coils 56 and 58 and these coils with their corresponding sense coils will provide an output which varies as the cosine of the angle.

Figure 7:
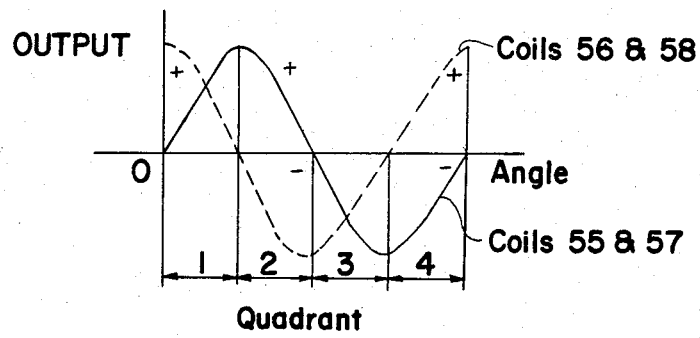
FIG. 7 is a graph depicting the output of the sensor of FIG. 6.

Referring to FIG. 7, there is shown the output from coils 55 and 57 and the output from coils 56 and 58. As also can be seen from FIG. 7, the sensor which use the four sensing coils provides the further advantages to determine the quadrant that the rotor or rotary plate 50 is in. Assume that the coils 55 and 57 provide the output signal and that coils 56 and 58 provide quadrant identification. In this manner it is a simple determination according to whether the output from coils 56 and 58 is positive or negative. Depending upon this polarity one can then determine the quadrant that the rotor is being operated in. Thus when the signal from coil 55 and 57 is positive during the first quadrant the output from coils 56 and 57 is also positive for the first quadrant. During the second quadrant the output of coils 55 and 57 is still positive while the output of coils 56 and 58 is negative. This unique condition defines the second quadrant. During the third quadrant the output of coil 55 and 57 is negative and the output of coils 56 and 58 is also negative. This defines the third quadrant or third 90° interval. During the fourth quadrant the output of coils 55 and 57 is negative while the output of coils 56 and 58 is positive and this uniquely defines the fourth quadrant. It is simple of course to determine polarity as the output signal may be compared with the drive signal in a comparator which will therefore give an indication as to the polarity of the output of both coils 55 and 57 and coils 56 and 58. The output signal obtained from the coils as 55 and 57 may be used in a data acquisition system along with the quadrant information from coils 56 and 58. In this manner one can extend this theory to determine the complete quadrant of operation over a 360° rotation. According to this construction one can therefore achieve a complete analog sensor which is linear over a wide operating range of rotation. Such a sensor does not exist in the prior art.

With the above considerations in mind it is seen that there is provided a number of rotary sensors which employ planar coils and which provide outputs indicative of any angle over a motion of 360°. The sensors are extremely easy to construct and operate and will provide reliable operation over wide angular ranges. It will be of course apparent to those skilled in the art that one can vary the shape of the rotatable plate to obtain many different rotary relationships without departing from the principles of this invention.

I claim:
1. A rotary displacement transducer, comprising:
    (a) a first planar member having disposed on a surface thereof four flat coil configurations each occupying a predetermined area on said surface and each located at 90° intervals with respect to one another and defining four quadrants,
    (b) a second planar member having disposed thereon four additional flat coil configurations each one aligned with and complimentary to an associated coil on said first planar member when said second planar member is positioned apart from said first member and relatively parallel to and facing said first member to form a space therebetween, whereby any magnetic field induced in one of said members can couple to the other,
    (c) a rotatable plate of a circular configuration and positioned in the space between said members and located to rotate about an axis eccentric to the center of said plate to cause said plate to fully cover only one of said coils and to partially cover two other coils as it rotates and fabricated from a material sufficient to block said magnetic field, said plate to provide, when rotated, magnetic field coupling between two opposite coils having an output indicative of a sinusoidal output with the coupling between the other two opposite coils indicative of a cosine output, whereby any two of said coils can provide quadrant identification for output signals taken from said two other coils.
2. The rotary displacement transducer according to claim 1 wherein said plate is fabricated from a ferromagnetic material.
3. The rotary displacement transducer according to claim 1 further including a source of electrical signals applied to said coils on said first planar member.
4. The rotary displacement transducer according to claim 1 wherein each coil on said planar member is fabricated from copper.
5. The rotary displacement transducer according to claim 1 wherein said first and second planar members are rectangular with said coils being a rectangular spiral configuration.

* * * * *